US012719144B2

(12) United States Patent
Ikeda et al.

(10) Patent No.: US 12,719,144 B2
(45) Date of Patent: Aug. 25, 2026

(54) WAVEGUIDE

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventors: Masakazu Ikeda, Nisshin-city (JP); Takahiro Kato, Nisshin (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 105 days.

(21) Appl. No.: 18/792,774

(22) Filed: Aug. 2, 2024

(65) Prior Publication Data

US 2025/0105484 A1 Mar. 27, 2025

(30) Foreign Application Priority Data

Sep. 22, 2023 (JP) ................................ 2023-159127

(51) Int. Cl.
*H01P 3/123* (2006.01)
*H01Q 1/38* (2006.01)
*H01Q 21/06* (2006.01)

(52) U.S. Cl.
CPC ............... *H01P 3/123* (2013.01); *H01Q 1/38* (2013.01); *H01Q 21/061* (2013.01)

(58) Field of Classification Search
CPC ......... H01P 3/123; H01Q 1/38; H01Q 21/061
(Continued)

(56) References Cited

U.S. PATENT DOCUMENTS 6,052,099 A 4/2000 Imaizumi et al.
6,121,939 A 9/2000 Imaizumi et al.
(Continued)

FOREIGN PATENT DOCUMENTS

JP 2007-336299 A 12/2007
JP 2010-278752 A 12/2010

OTHER PUBLICATIONS

F. Arndt, R. Beyer, J.M. Reiter, T. Sieverding, and T. Wolf, âAutomated design of waveguide components using hybrid mode-matching/numerical EM building-blocks in optimization-oriented CAD frame-works.â 1997; IEEE Trans. Microwave Theory and Tech.: vol. 45; pp. 747-760 (Year: 1997).*
(Continued)

*Primary Examiner* — Andrea Lindgren Baltzell
*Assistant Examiner* — Victor Cole
(74) *Attorney, Agent, or Firm* — Posz Law Group, PLC

(57) ABSTRACT

A waveguide includes a first waveguide having a first waveguide hole and a second waveguide having a second waveguide hole and assembled to the first waveguide with a predetermined gap therebetween. The second waveguide hole has an opening on one surface of the second waveguide facing the first waveguide, and the opening has a rounded polygonal shape or a circular shape. The second waveguide includes a resin molded product and a metal coating film covering the resin molded product, and the second waveguide has a choke groove around the second waveguide hole. The choke groove has such a shape that a length between a wall surface of the second waveguide hole and an inner wall surface of the choke groove adjacent to the second waveguide hole is constant along a circumferential direction of the second waveguide hole.

5 Claims, 17 Drawing Sheets

(58) Field of Classification Search
USPC .................................................. 333/239, 242
See application file for complete search history.

(56) References Cited

U.S. PATENT DOCUMENTS

| | | | | |
|---|---|---|---|---|
| 6,388,633 | B1 | 5/2002 | Imaizumi et al. | |
| 2002/0097187 | A1 | 7/2002 | Imaizumi et al. | |
| 2010/0231332 | A1 | 9/2010 | Sugimoto et al. | |
| 2018/0024226 | A1* | 1/2018 | Izadian .................. | H01Q 21/24 342/188 |
| 2020/0028228 | A1* | 1/2020 | Yoshioka ................ | H01P 5/087 |
| 2020/0220245 | A1* | 7/2020 | Algaba Brazalez ...... | H01P 3/12 |
| 2023/0187803 | A1* | 6/2023 | Takemoto ............. | H01P 11/002 333/239 |

OTHER PUBLICATIONS

U.S. Appl. No. 18/792,702, filed Aug. 2, 2024, Isono et al.

* cited by examiner

WAVEGUIDE

CROSS REFERENCE TO RELATED APPLICATION

The present application claims the benefit of priority from Japanese Patent Application No. 2023-159127 filed on Sep. 22, 2023. The entire disclosure of the above application is incorporated herein by reference.

TECHNICAL FIELD

The present disclosure relates to a waveguide.

BACKGROUND

Conventionally, waveguides for transmitting high-frequency electromagnetic fields have been proposed.

SUMMARY

A waveguide according to an aspect of the present disclosure includes a first waveguide having a first waveguide hole, and a second waveguide having a second waveguide hole and assembled to the first waveguide with a predetermined gap between the first waveguide and the second waveguide. The first waveguide and the second waveguide are assembled in a state capable of transmitting an electromagnetic wave through the first waveguide hole and the second waveguide hole. The second waveguide hole has an opening on one surface of the second waveguide facing the first waveguide, and the opening has a rounded polygonal shape or a circular shape. The second waveguide includes a resin molded product and a metal coating film covering the resin molded product, and the second waveguide has a choke groove around the second waveguide hole. The choke groove has such a shape that a length between a wall surface of the second waveguide hole and an inner wall surface of the choke groove adjacent to the second waveguide hole is constant along a circumferential direction of the second waveguide hole.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
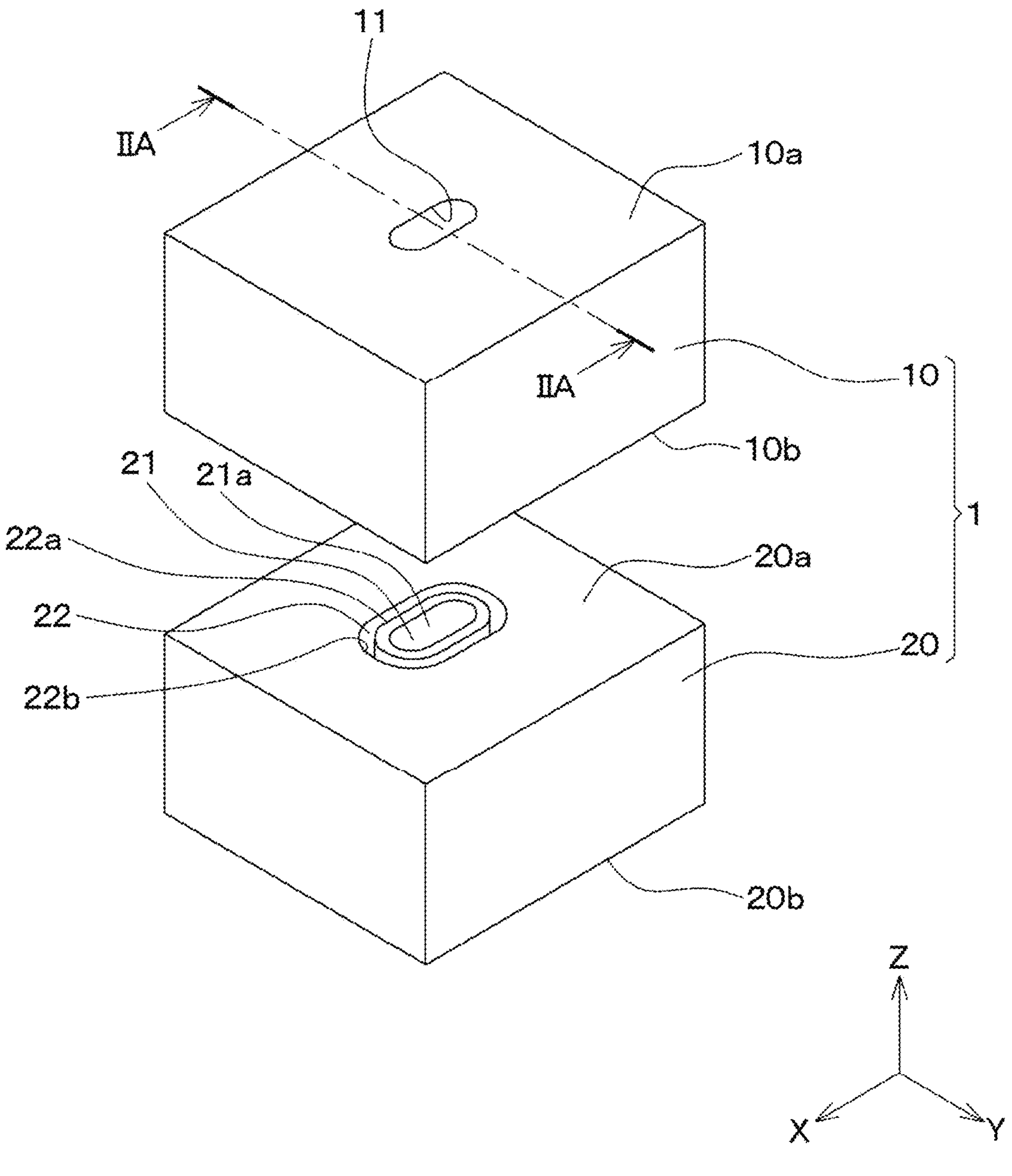
FIG. 1 is a perspective view of a waveguide according to a first embodiment.

Next, a relevant technology is described only for understanding the following embodiments. A waveguide according to the relevant technology includes a first waveguide formed of a wiring board or the like and having a first waveguide hole, and a second waveguide formed of a metal and having a second waveguide hole. The waveguide is configured by joining the first waveguide and the second waveguide such that the first waveguide hole and the second waveguide hole communicate with each other.

In the waveguide described above, the first waveguide has a choke groove substantially surrounding the first waveguide hole so as to restrict electromagnetic field from leaking through a gap generated between the first waveguide and the second waveguide.

The present inventors considered forming a second waveguide including a resin molded product such as plastic, and forming a choke groove substantially surrounding a second waveguide hole in the second waveguide in order to reduce the number of processing steps and a weight of the second waveguide. However, according to studies by the present inventors, it has been found that, depending on the shape of the second waveguide hole and the shape of the choke groove, a structural defect such as collapse of a portion located between the second waveguide hole and the choke groove may occur.

A waveguide according to an aspect of the present disclosure includes a first waveguide having a first waveguide hole, and a second waveguide having a second waveguide hole and assembled to the first waveguide with a predetermined gap between the first waveguide and the second waveguide. The first waveguide and the second waveguide are assembled in a state capable of transmitting an electromagnetic wave through the first waveguide hole and the second waveguide hole. The second waveguide hole has an opening on one surface of the second waveguide facing the first waveguide, and the opening has a rounded polygonal shape or a circular shape. The second waveguide includes a resin molded product and a metal coating film covering the resin molded product, and the second waveguide has a choke groove around the second waveguide hole. The choke groove has such a shape that a length between a wall surface of the second waveguide hole and an inner wall surface of the choke groove adjacent to the second waveguide hole is constant along a circumferential direction of the second waveguide hole.

According to the above-described configuration, when the resin molded product having the second waveguide hole and the choke groove is manufactured by pouring molten resin into a mold, the molten resin tends to flow evenly between the wall surface of the second waveguide hole and the inner wall surface of the choke groove. Thus, it is possible to restrict structural defects such as collapse of a portion between the wall surface of the second waveguide hole and the inner wall surface of the choke groove adjacent to the second waveguide.

Embodiments of the present disclosure will be described below with reference to the drawings. In the following embodiments, the same or equivalent parts are denoted by the same reference numerals for description.

First Embodiment

A waveguide 1 according to a first embodiment will be described with reference to the drawings. The waveguide 1 of the present embodiment is preferably used to transmit a high-frequency electromagnetic field, for example.

Figure 2A:
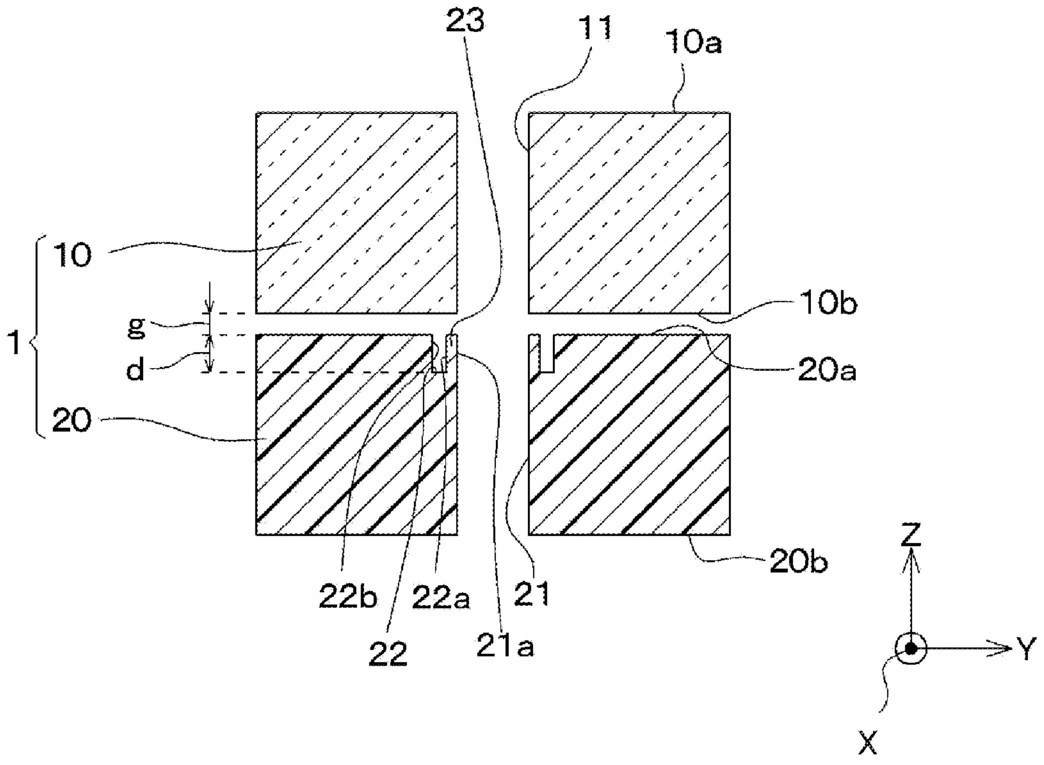
FIG. 2A is a cross-sectional view of the waveguide taken along line IIA-IIA in FIG. 1.

As shown in FIG. 1 and FIG. 2A, the waveguide 1 includes a first waveguide 10 and a second waveguide 20, which are assembled together. In order to facilitate understanding, FIG. 1 shows a diagram in which the first waveguide 10 and the second waveguide 20 are widely separated from each other so that the shapes of a second waveguide hole 21 and a choke groove 22, which will be described later, can be seen.

The first waveguide 10 includes a printed circuit board, a wiring board, or the like having a first surface 10*a* and a second surface 10*b*. The first waveguide 10 has a first waveguide hole 11 that penetrates the first waveguide 10 from the first surface 10*a* to the second surface 10*b*. The first waveguide hole 11 is formed by a drill or the like. The first waveguide hole 11 has an opening that has substantially the same shape as an opening of a second waveguide hole 21 described later. Although not shown, a metal coating film of about 1 μm containing aluminum, copper, silver or the like is disposed in the first waveguide hole 11.

Figure 2B:
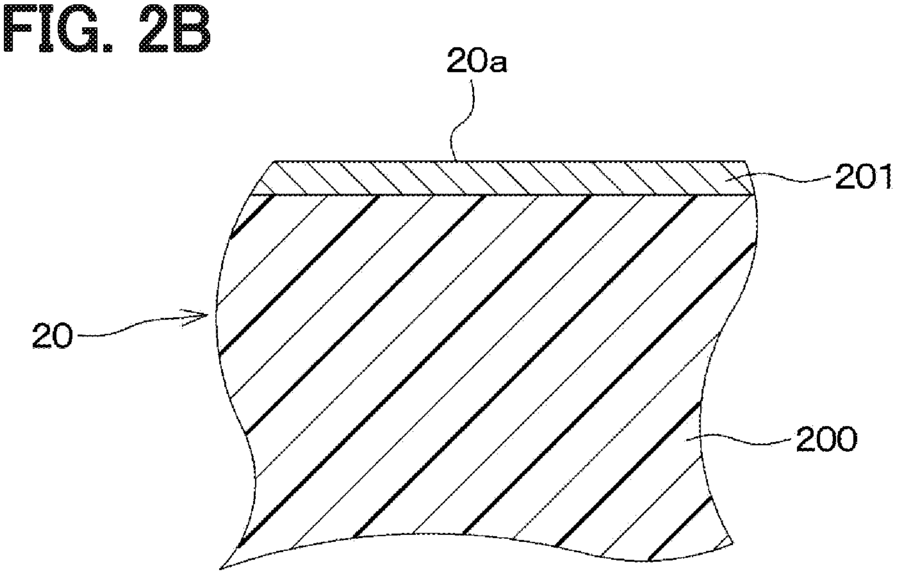
FIG. 2B is an enlarged cross-sectional view of a portion of a second waveguide adjacent to a first surface of the second waveguide.

The second waveguide 20 has a plate shape having a first surface 20*a* and a second surface 20*b*. The second waveguide 20 includes a resin molded product 200 and a metal coating film 201 coating the resin molded product 200, as shown in FIG. 2B. As shown in FIG. 1 and FIG. 2A, the second waveguide 20 has the second waveguide hole 21 and the choke groove 22. The second waveguide hole 21 penetrates the second waveguide 20 from the first surface 20*a* to the second surface 20*b*. The choke groove 22 is formed around the second waveguide hole 21 in the first surface 20*a*.

The resin molded product 200 is made of a resin material such as acrylonitrile butadiene styrene (ABS) or polyphenyl ether (PPE). The metal coating film 201 is made of aluminum, copper, silver, or the like and has a thickness of about 1 μm. The second waveguide 20 is formed by pouring molten resin into a mold and solidifying it to form the resin molded product 200 in which the second waveguide hole 21 and the choke groove 22 are formed, and then arranging the metal coating film 201 over the entire surface of the resin molded product 200 by sputtering, vapor deposition, or the like. In FIG. 2A, the metal coating film 201 is omitted because the thickness of the metal coating film 201 is sufficiently thin compared to the resin molded product 200. The metal coating film 201 in the second waveguide 20 of the present embodiment is formed on the entire surface of the resin molded product 200. Therefore, each surface of the second waveguide 20, including the first surface 20*a* and the second surface 20*b*, is made of the metal coating film 201.

The shapes of the second waveguide hole 21 and the choke groove 22 of the second waveguide 20 in the present embodiment will be described with reference to FIG. 3. In the following description, a direction along a planar direction of the first surface 20*a* of the second waveguide 20 is defined as an X-axis direction, a direction perpendicular to the X-axis direction and along the planar direction of the first surface 20*a* is defined as a Y-axis direction, and the normal direction to the first surface 20*a* is defined as a Z-axis direction.

Figure 3:
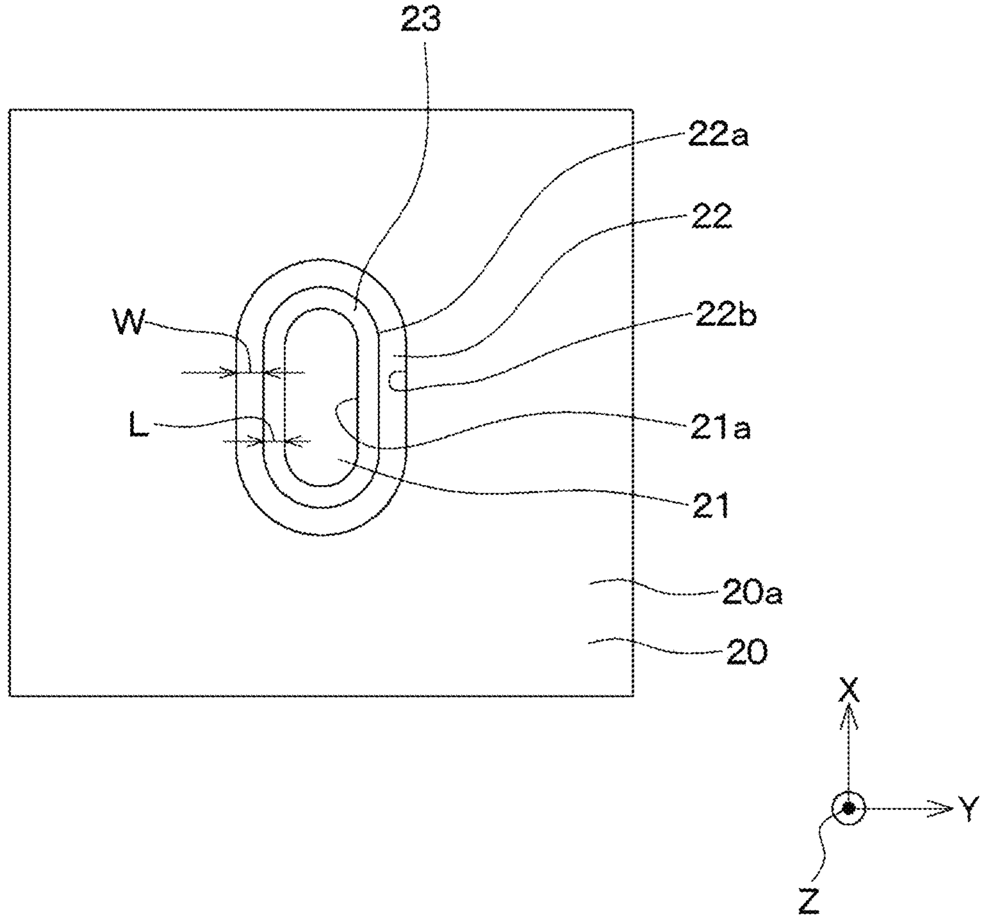
FIG. 3 is a plan view of the first surface of the second waveguide.

As shown in FIG. 3, the second waveguide hole 21 has an opening having a rounded corner polygonal shape on the first surface 20*a*. In other words, the second waveguide hole 21 has an opening without unrounded corners on the first surface 20*a*. In other words, the opening of the second waveguide hole 21 on the first surface 20*a* has a polygonal shape with curvature at corners. Examples of the rounded corner polygonal shape include a rounded rectangular shape and a rounded hexagonal shape.

In the present embodiment, the opening of the second waveguide hole 21 has a rounded rectangular shape with its long side direction parallel to the X-axis direction and its short side direction parallel to the Y-axis direction, and the ends of two opposing sides along the X-axis direction are connected by an arc. In the following, an example in which the opening of the second waveguide hole 21 has a rounded corner polygonal shape will be described, but the second waveguide hole 21 may have any shape without unrounded corners, such as a circular shape. In the present disclosure, the circular shape includes not only a perfect circle but also an ellipse and the like.

In the present embodiment, the choke groove 22 has a frame shape so as to surround the second waveguide hole 21. In addition, the choke groove 22 has such a shape that a length L between a wall surface 21*a* of the second waveguide hole 21 and an inner wall surface 22*a* of the choke groove 22 adjacent to the second waveguide hole 21 is constant along a circumferential direction of the second waveguide hole 21. In other words, the choke groove 22 is formed such that a surface obtained by moving the wall surface 21*a* of the second waveguide hole 21 outward in parallel becomes the inner wall surface 22*a*. Furthermore, in other words, when a portion between the second waveguide hole 21 and the choke groove 22 is defined as a wall portion 23, the choke groove 22 is formed so that a thickness of the wall portion 23 is constant along the circumferential direction of the second waveguide hole 21. Note that "along the circumferential direction of the second waveguide hole 21" can also be said to be "along an axis passing through the center of the second waveguide hole 21". The reason why the second waveguide hole 21 has a shape without unrounded corners as described above is to ensure that the length L between the wall surface 21*a* of the second waveguide hole 21 and the inner wall surface 22*a* of the choke groove 22 is constant along the circumferential direction of the second waveguide hole 21.

The shapes of the second waveguide hole 21 and the choke groove 22 in the present embodiment have been described above. When manufacturing the resin molded product 200 having the second waveguide hole 21 and the choke groove 22 formed therein, a mold having protrusions or the like arranged at portions corresponding to the second waveguide hole 21 and the choke groove 22 is prepared, and molten resin is poured into the mold and allowed to solidify. In the present embodiment, the length L between the wall surface 21*a* of the second waveguide hole 21 and the inner wall surface 22*a* of the choke groove 22 is constant along the circumferential direction of the second waveguide hole 21. For this reason, when the molten resin is poured, the molten resin tends to flow evenly between the wall surface 21*a* of the second waveguide hole 21 and the inner wall surface 22*a* of the choke groove 22, compared to, for example, a case in which the length L between the wall surface 21*a* of the second waveguide hole 21 and the inner wall surface 22*a* of the choke groove 22 varies along the circumferential direction of the second waveguide hole 21. Therefore, it is possible to restrict the occurrence of structural defects such as a collapse of the portion between the wall surface 21*a* of the second waveguide hole 21 and the inner wall surface 22*a* of the choke groove 22 (that is, the wall portion 23).

Then, as shown in FIG. 2A, the first waveguide 10 and the second waveguide 20 are assembled in a state in which the second surface 10*b* of the first waveguide 10 and the first surface 20*a* of the second waveguide 20 face each other in the Z-axis direction. Specifically, in order to respond to warping due to differences in thermal expansion between the first waveguide 10 and the second waveguide 20, the first waveguide 10 and the second waveguide 20 are assembled in a state in which a predetermined gap g is provided in advance between the second surface 10*b* of the first waveguide 10 and the first surface 20*a* of the second waveguide 20. Furthermore, the first waveguide 10 and the second waveguide 20 are assembled in a state capable of transmitting an electromagnetic wave through the first waveguide hole 11 and the second waveguide hole 21, and are assembled, for example, so that the center of the first waveguide hole 11 on the second surface 10*b* and the center of the second waveguide hole 21 on the first surface 20*a* face each other. The first waveguide 10 and the second waveguide 20 are assembled, for example, in a cross section different from that shown in FIG. 2A, by forming an engagement recess in the first waveguide 10 and forming an engagement protrusion in the second waveguide 20, and inserting the engagement protrusion into the engagement recess. In this case, the first waveguide 10 and the second waveguide 20 are assembled with the length of the gap g adjusted by appropriately adjusting a depth of the engaging recess and a height of the engaging protrusion.

The above describes the configuration of the waveguide 1 in the present embodiment. Next, a method of using the waveguide 1 will be described, along with a more detailed description of the structure and effects thereof.

Figure 4:
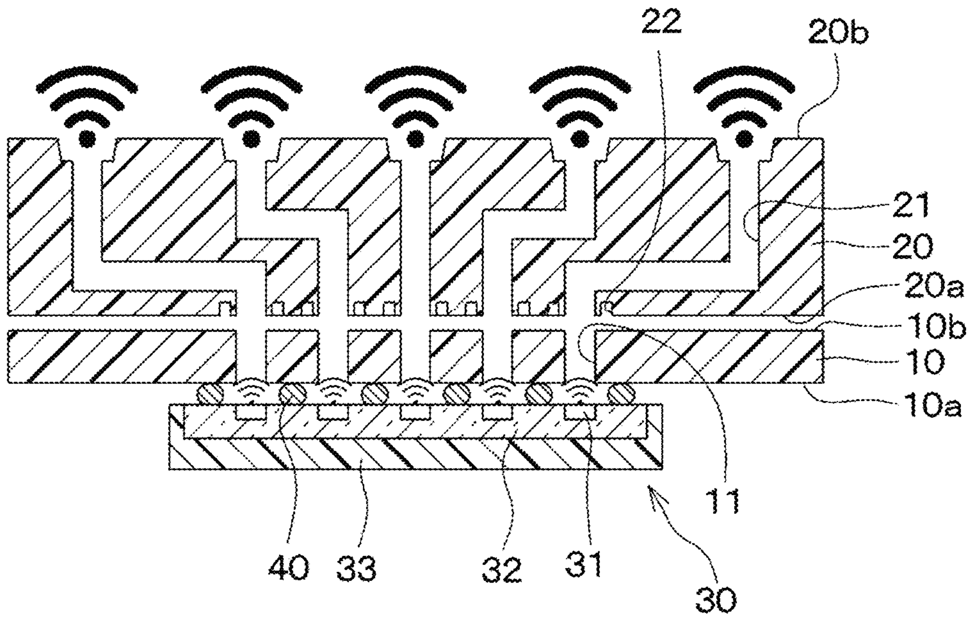
FIG. 4 is a schematic cross-sectional view of a millimeter wave radar formed with the waveguide of the first embodiment.

The waveguide 1 described above is used, for example, to form a millimeter wave radar in which a plurality of antennas is arranged. As shown in FIG. 4, the first surface 10*a* of the first waveguide 10 is joined to a semiconductor module 30 having an antenna portion 31 via a joining member 40 such as solder. The semiconductor module 30 includes, for example, a wiring board 32 on which the antenna portion 31 is formed, and a mold resin 33 that seals the wiring board 32 so that the antenna portion 31 is exposed.

In the present embodiment, the first waveguide 10 and the second waveguide 20 are assembled in a state in which the predetermined gap g is maintained, so that there is a possibility that an electromagnetic field will leak from the gap g. However, the second waveguide 20 has the choke groove 22 as described above. Therefore, it is possible to restrict a transmission coefficient from deteriorating.

Figure 5:
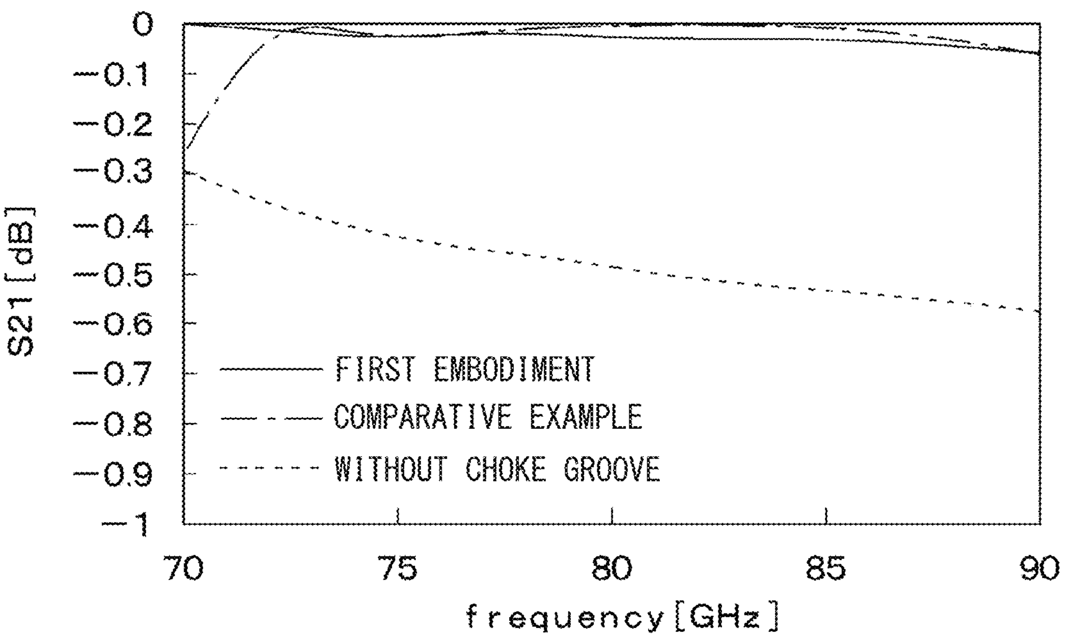
FIG. 5 is a diagram showing the relationship between frequency and transmission coefficient.
Figure 6:
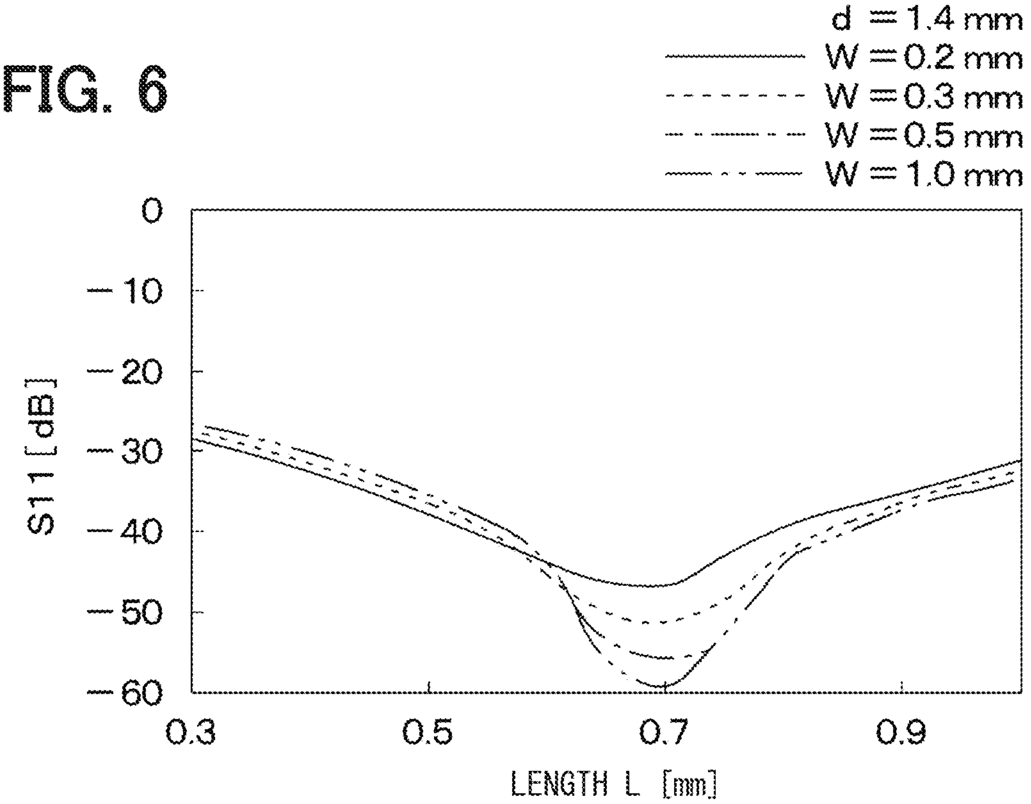
FIG. 6 is a diagram showing the relationship between a length between a second waveguide hole and an inner wall surface of a choke groove and reflection coefficient.
Figure 7:
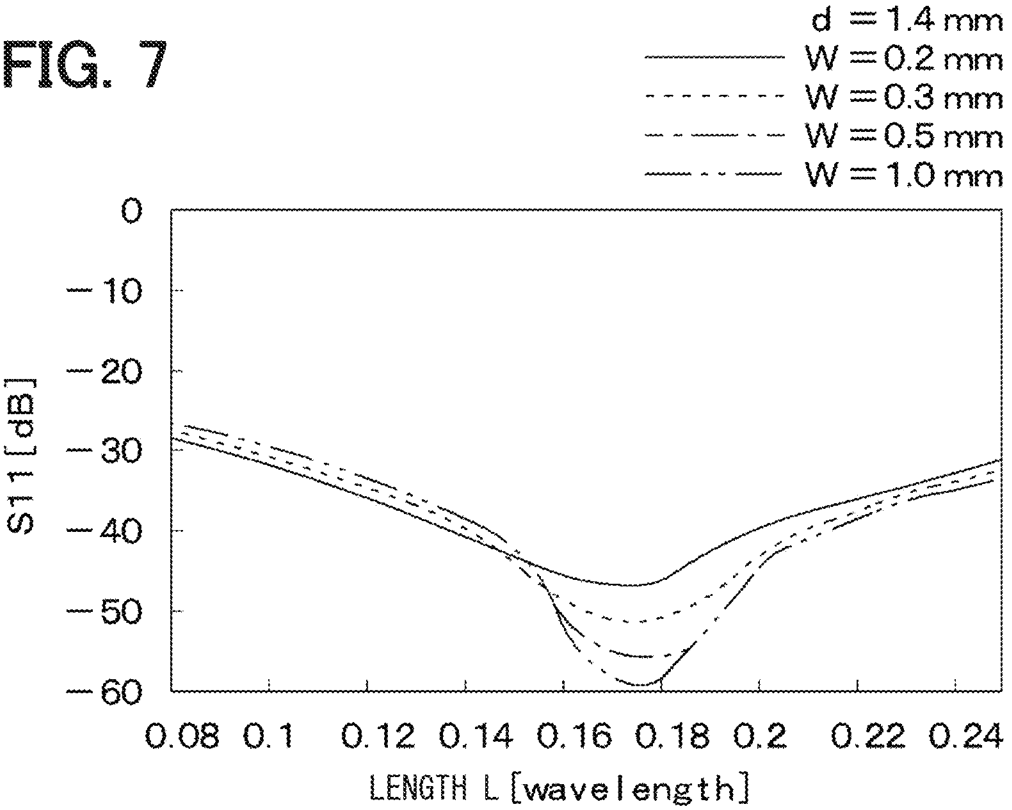
FIG. 7 is a diagram showing the relationship between the length between the second waveguide hole and the inner wall surface of the choke groove and reflection coefficient.
Figure 8:
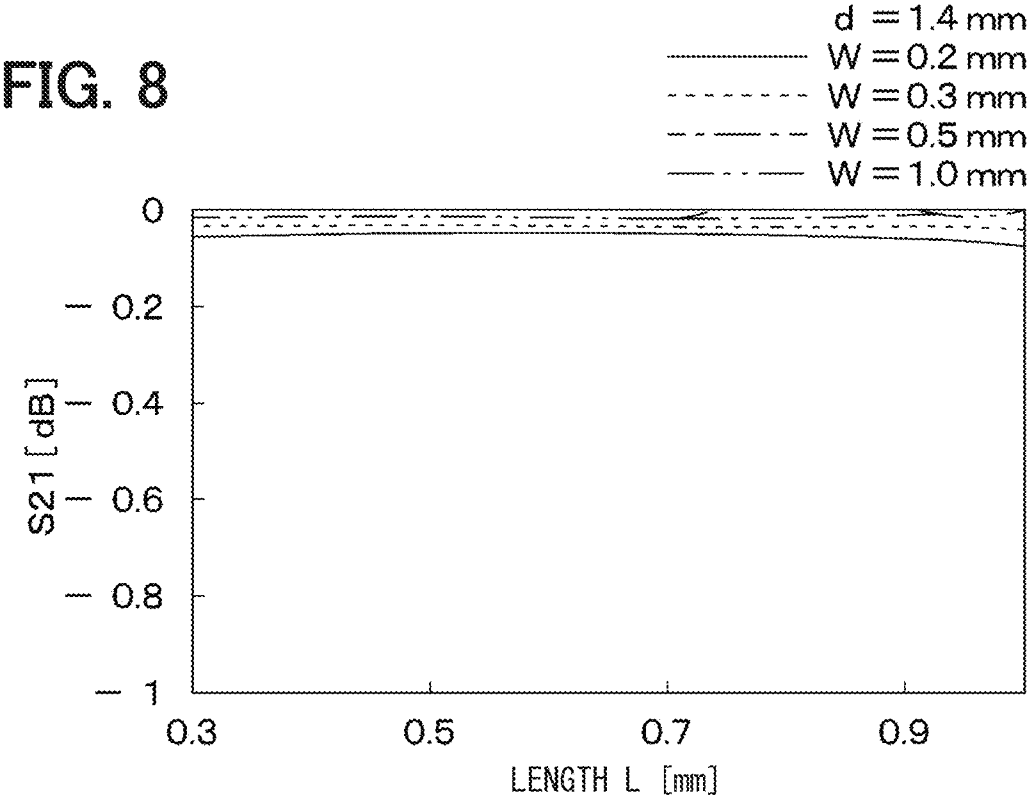
FIG. 8 is a diagram showing the relationship between the length between the second waveguide hole and the inner wall surface of the choke groove and transmission coefficient.
Figure 9:
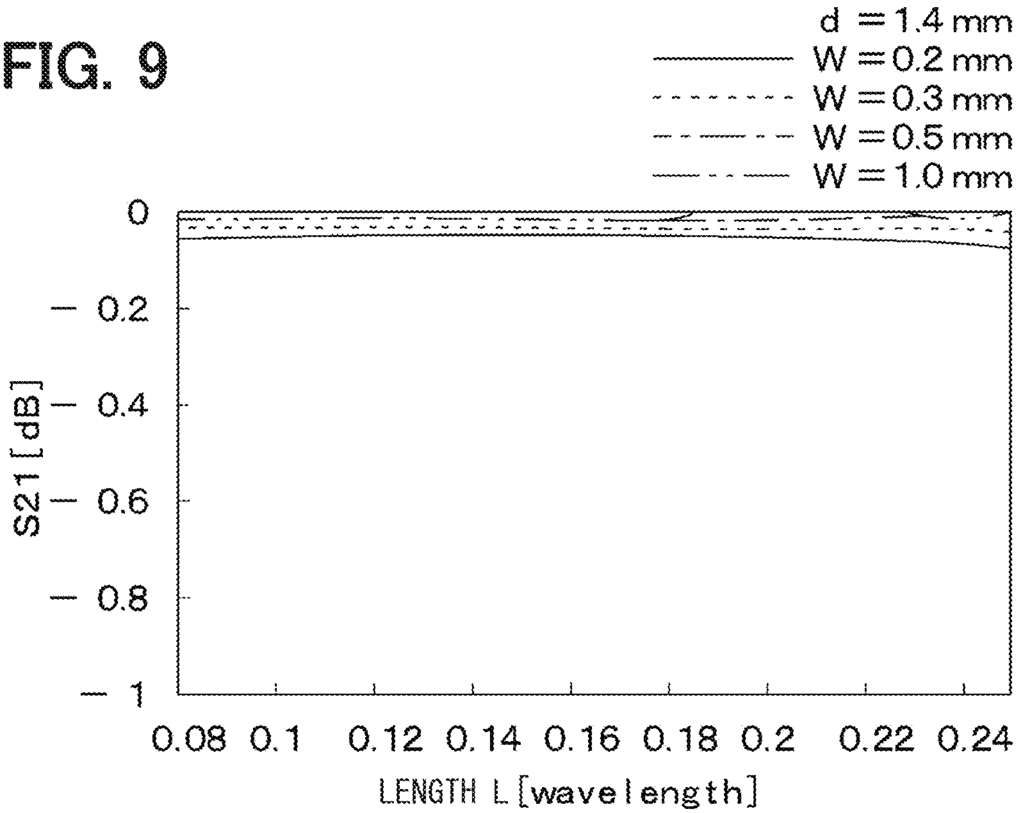
FIG. 9 is a diagram showing the relationship between the length between the second waveguide hole and the inner wall surface of the choke groove and transmission coefficient.

Specifically, the present inventors conducted diligent studies on a transmission coefficient S21 as a transmission characteristic of the waveguide 1, and obtained the results shown in FIG. 5. FIG. 5 is a diagram showing a relationship between a frequency and the transmission coefficient S21, in which an input side is the first waveguide 10 and an output side is the second waveguide 20. Note that the transmission coefficient S21 and a reflection coefficient S11, which will be described later, are defined by setting the first waveguide 10 as the input side and setting the second waveguide 20 as the output side.

FIG. 5 shows results when an electrically effective wavelength λ is 3.92 mm. FIG. 5 shows a result of the waveguide 1 of the present embodiment shown in FIG. 3 in a case where the length L between the wall surface 21*a* of the second waveguide hole 21 and the inner wall surface 22*a* of the choke groove 22 (that is, the thickness of the wall portion 23) is set to 0.3 mm=0.0765λ, and a width W between the inner wall surface 22*a* and an outer wall surface 22*b* of the choke groove 22 is set to 0.475 mm=0.121λ, a depth d of the choke groove 22 is set to 1.4 mm=0.35λ and the gap g is set to 0.1 mm. In the following, the length between the wall surface 21*a* of the second waveguide hole 21 and the inner wall surface 22*a* of the choke groove 22 (that is, the thickness of the wall portion 23) is also simply referred to as the length L, and the width between the inner wall surface 22*a* and the outer wall surface 22*b* of the choke groove 22 is also simply referred to as the width W. FIG. 5 also shows a result of a waveguide of a comparative example in which the second waveguide 20 is made of metal and the length L and width W are set to one quarter of the electrically effective wavelength λ (that is, 3.92 mm). FIG. 5 further shows a result of a waveguide in which the second waveguide 20 is made of metal and the choke groove 22 is not formed.

As shown in FIG. 5, in the case of the waveguide without the choke groove 22, it has been confirmed that an energy leakage of about-0.5 dB occurs at an operating frequency of 76.5 GHZ, which is generally used in millimeter wave radar. However, it has been confirmed that the waveguide 1 of the present embodiment has almost no leakage at 76.5 GHZ, and that it is possible to obtain the transmission coefficient S21 that is almost the same as the transmission coefficient S21 of the waveguide of the comparative example. In other words, it has been confirmed that even when the second waveguide 20 is configured to include the resin molded product 200, it is possible to obtain the same transmission coefficient S21 as when the second waveguide 20 is made of metal.

The present inventors further conducted diligent studies on the relationship between the length L and the reflection coefficient S11 and the relationship between the length L and the transmission efficient S21 in cases where the depth d is fixed to 1.4 mm and the width W is changed into 0.2 mm, 0.3 mm, 0.5 mm, and 1.0 mm. The length L is indicated in mm in FIG. 6 and FIG. 8, and is indicated in the electrically effective wavelength in FIG. 7 and FIG. 9. As shown in FIGS. 6 to 9, it has been confirmed that even when the width W is changed, the effect on the reflection coefficient S11 and the transmission coefficient S21 is small. Therefore, the width W may be appropriately changed depending on the ease of molding the resin molded product 200 that constitutes the second waveguide 20. However, a region in which the reflection coefficient S11 becomes small becomes wider in band with increase in the width W. Therefore, it is preferable that the width W is appropriately changed depending on the application. It is considered that the reflection coefficient S11 of −20 dB or less can fully meet current requirements.

Figure 10:
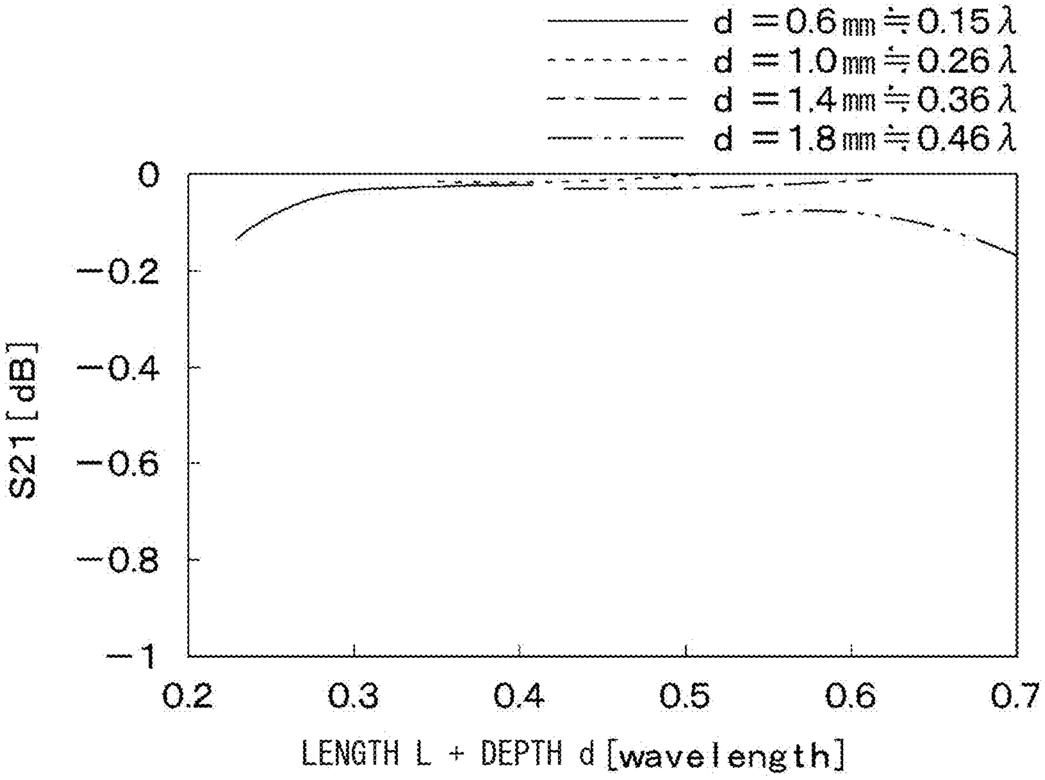
FIG. 10 is a diagram showing the relationship between the sum of the length between the second waveguide hole and the inner wall surface of the choke groove and a depth of the choke groove, and transmission coefficient.

The present inventors further conducted diligent studies on the relationship between the sum of the length L and the depth d and the transmission coefficient S21, and obtained the results shown in FIG. 10. FIG. 10 shows results when a typical operating frequency is 76.5 GHZ and the electrically effective wavelength λ is 3.92 mm.

As shown in FIG. 10, it has been confirmed that when the sum of the length L1 and the depth d is within the range of 0.2 to 0.7λ of the operating frequency, the deterioration of the transmission coefficient S21 can be sufficiently restricted. Conventionally, the length L is generally set to ¼λ and the depth d is generally set to ¼ λ. However, according to the diligent studies by the present inventors, it has been confirmed that, as described above, when the sum of the length L1 and the depth d is within the range of 0.2 to 0.7λ of the operating frequency, the deterioration of the transmission coefficient S21 can be sufficiently restricted. Therefore, in the second waveguide 20 of the present embodiment, the values of the length L and the depth d can be changed as appropriate, so long as the sum of the length L and the depth d is 0.2 to 0.7λ of the operating frequency.

Figure 11:
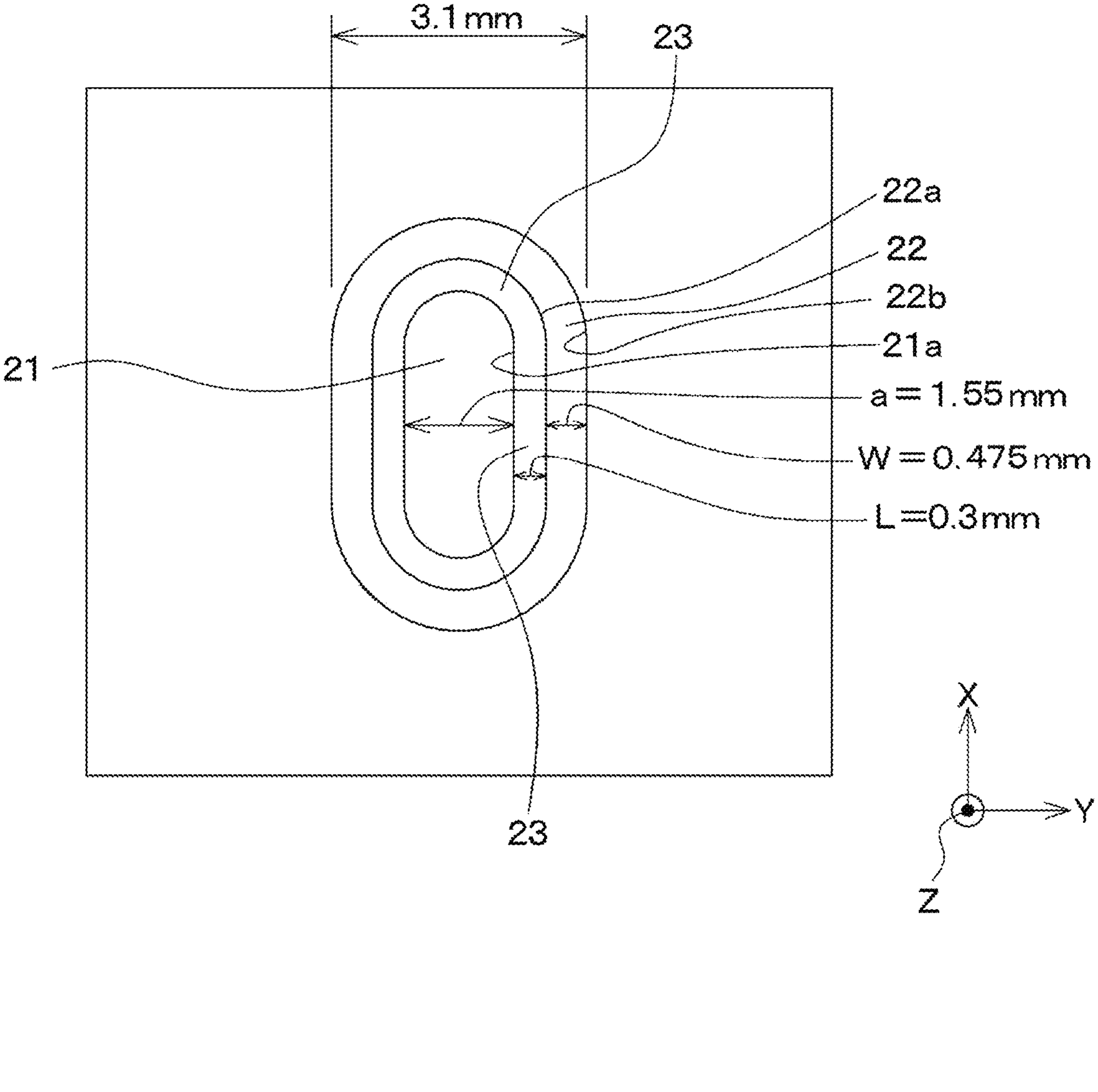
FIG. 11 is a diagram for explaining dimensions of the second waveguide in the first embodiment.
Figure 12:
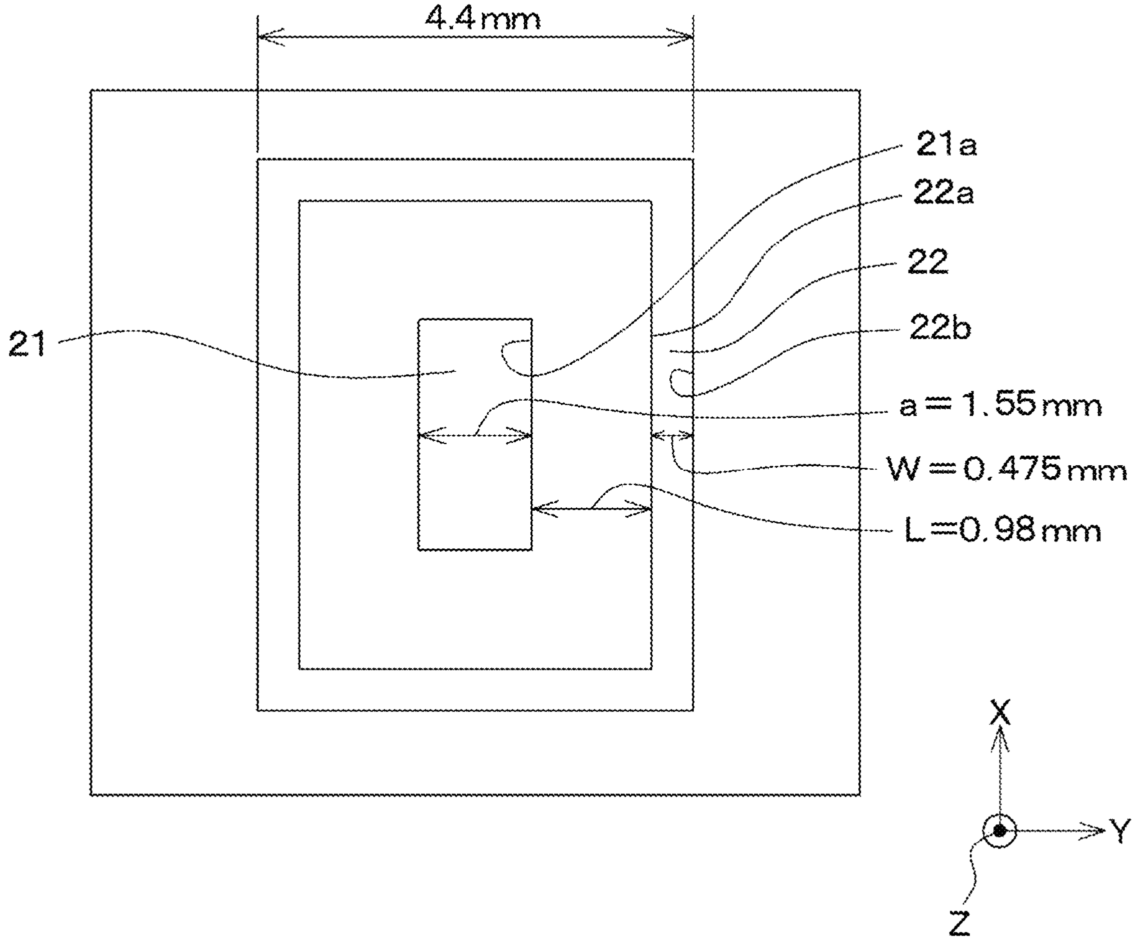
FIG. 12 is a diagram for explaining dimensions of a second waveguide in a comparative example.

For example, as shown in FIGS. 11 and 12, the second waveguide hole 21 has a short side length a of 1.55 mm and a width W of 0.475 mm at the opening. As shown in FIG. 11, the second waveguide hole 21 in the present embodiment has an opening in the shape of a rectangle with rounded corners. On the other hand, as shown in FIG. 12, a second waveguide hole 21 of a comparative example has an opening having a rectangular shape. In the present embodiment, as shown in FIG. 11, the length L is set to 0.3 mm (that is, 0.07λ), while in the waveguide of the comparative example, the length L is set to 0.98 mm (that is, ¼ λ). In the present embodiment, the depth d is appropriately adjusted so that the sum of the length L and the depth d is 0.2 to 0.7λ. In this case, the length of the outer wall surfaces 22*b* of the choke groove 22 facing each other in the Y-axis direction is 3.1 mm in FIG. 11 and 4.4 mm in FIG. 12. That is, in the present embodiment, the length in the Y-axis direction can be shortened by about 30%, and the size in the Y-axis direction can be reduced.

Although not specifically shown, the choke groove 22 can also be designed so that the length L is longer, so long as the sum of the length L and the depth d is 0.2 to 0.7λ. When the choke groove 22 is formed so that the length L is long, the thickness of the wall portion 23 becomes large. Therefore, when the length L is increased, the strength of the wall portion 23 can be improved and the manufacturing process can be simplified.

According to the present embodiment described above, the second waveguide 20 is configured to include the resin molded product 200. The choke groove 22 is formed so that the length L between the wall surface 21*a* of the second waveguide hole 21 and the inner wall surface 22*a* of the choke groove 22 is constant along the circumferential direction of the second waveguide hole 21. Thus, when the resin molded product 200 having the second waveguide hole 21 and the choke groove 22 is manufactured by pouring molten resin into a mold, the molten resin tends to flow evenly between the wall surface 21*a* of the second waveguide hole 21 and the inner wall surface 22*a* of the choke groove 22. Therefore, it is possible to restrict the occurrence of structural defects such as the collapse of the portion between the wall surface 21*a* of the second waveguide hole 21 and the inner wall surface 22*a* of the choke groove 22 adjacent to the second waveguide hole 21 (that is, the wall portion 23).

In the present embodiment, the choke groove 22 has the frame shape so as to surround the second waveguide hole 21. Thus, it is easier to restrict the electromagnetic wave from leaking through the gap g.

In the present embodiment, the sum of the length L and the depth d of the second waveguide 20 is set to 0.2 to 0.7λ of the operating frequency. Therefore, when the length L is shortened within a range in which the sum of the length L and the depth d is 0.2 to 0.7λ of the operating frequency, the second waveguide 20 can be made smaller. On the other hand, when the length L is increased within a range in which the sum of the length L and the depth d is 0.2 to 0.7λ of the operating frequency, the strength of the wall portion 23 can be improved and the manufacturing process can be simplified.

Modifications of First Embodiment

Figure 13:
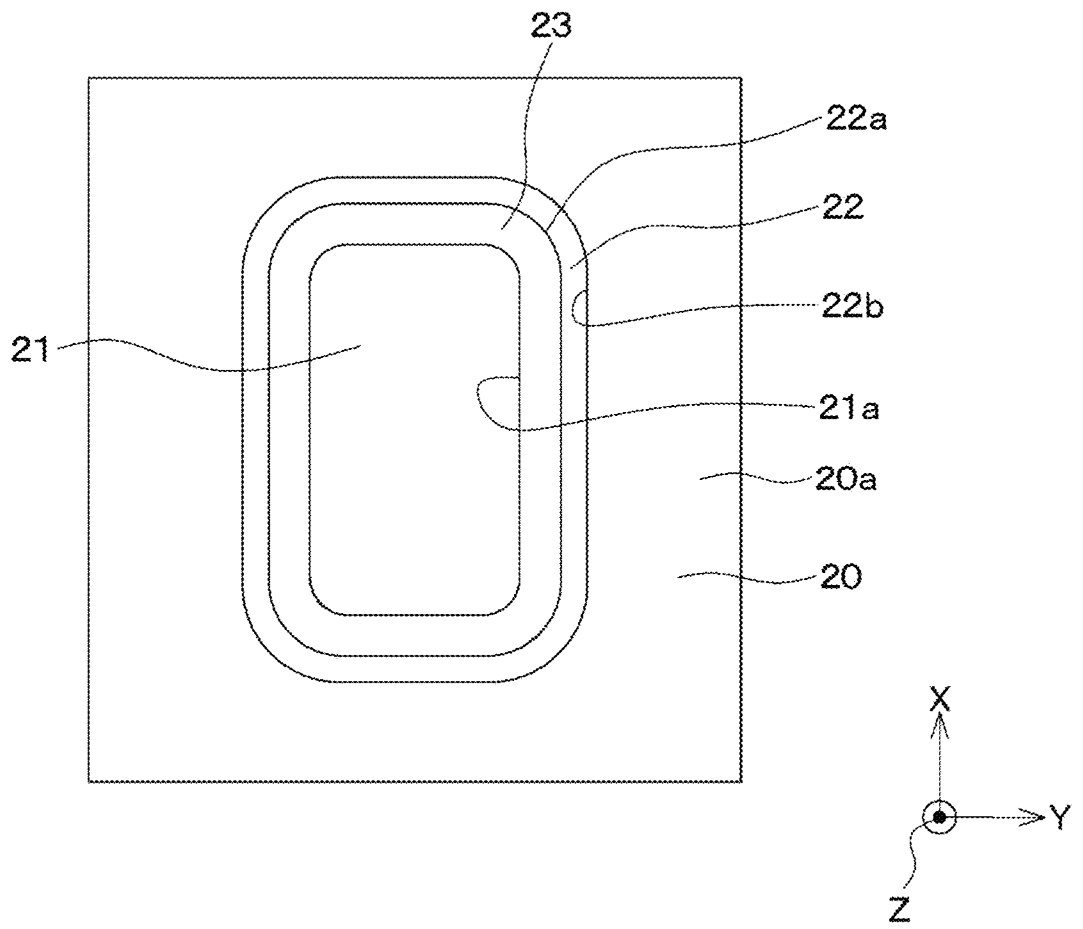
FIG. 13 is a plan view of a first surface of a second waveguide in a modification of the first embodiment.
Figure 14:
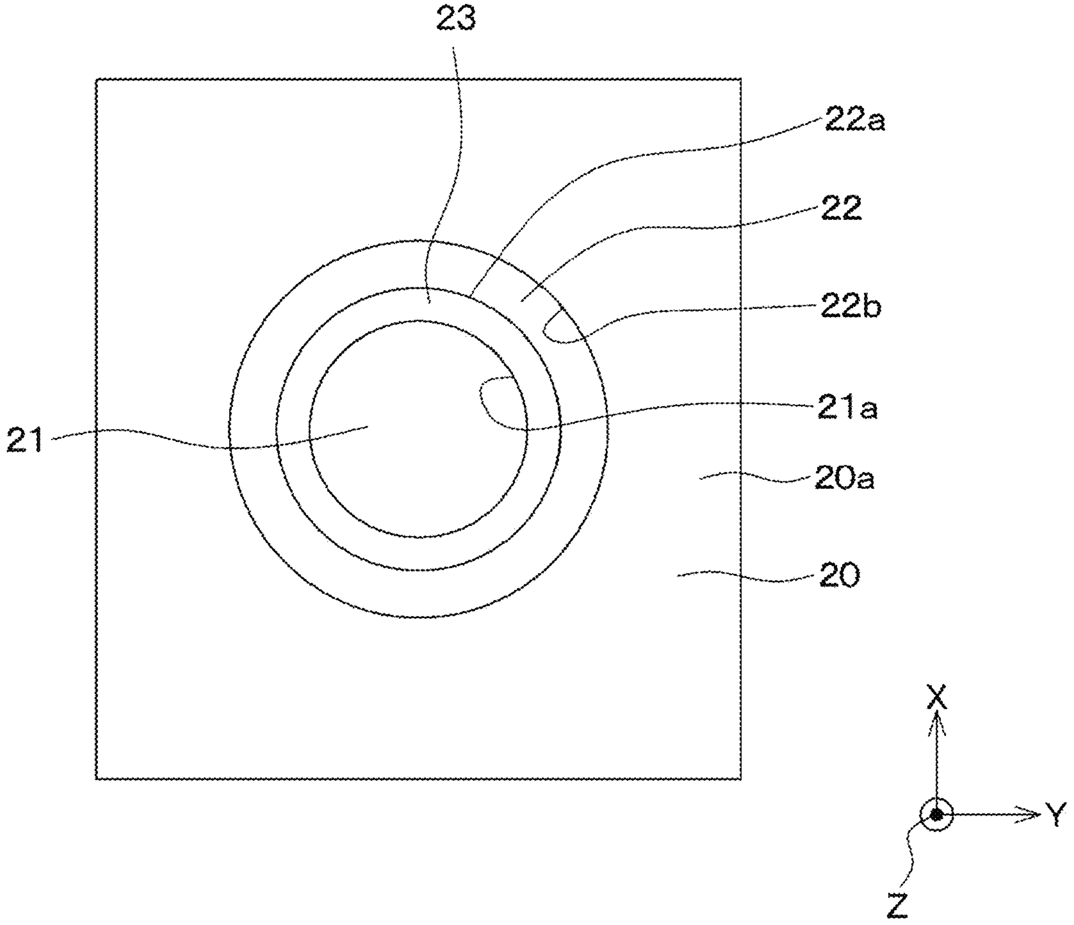
FIG. 14 is a plan view of a first surface of a second waveguide in another modification of the first embodiment.

Modifications of the first embodiment will be described below. As described in the first embodiment, the detailed shape of the second waveguide hole 21 can be changed as appropriate, so long as the opening on the first surface 20*a* does not have any unrounded corners and the thickness of the wall portion 23 is constant. For example, as shown in FIG. 13, the second waveguide hole 21 may have a rounded rectangular shape having two opposing sides along the X-axis direction and two opposing sides along the Y-axis direction, with these sides connected by arcs. As shown in FIG. 14, the second waveguide hole 21 may have a circular shape. Even in these cases, the choke groove 22 is formed around the second waveguide hole 21 so that the thickness of the wall portion 23 is constant.

Figure 15:
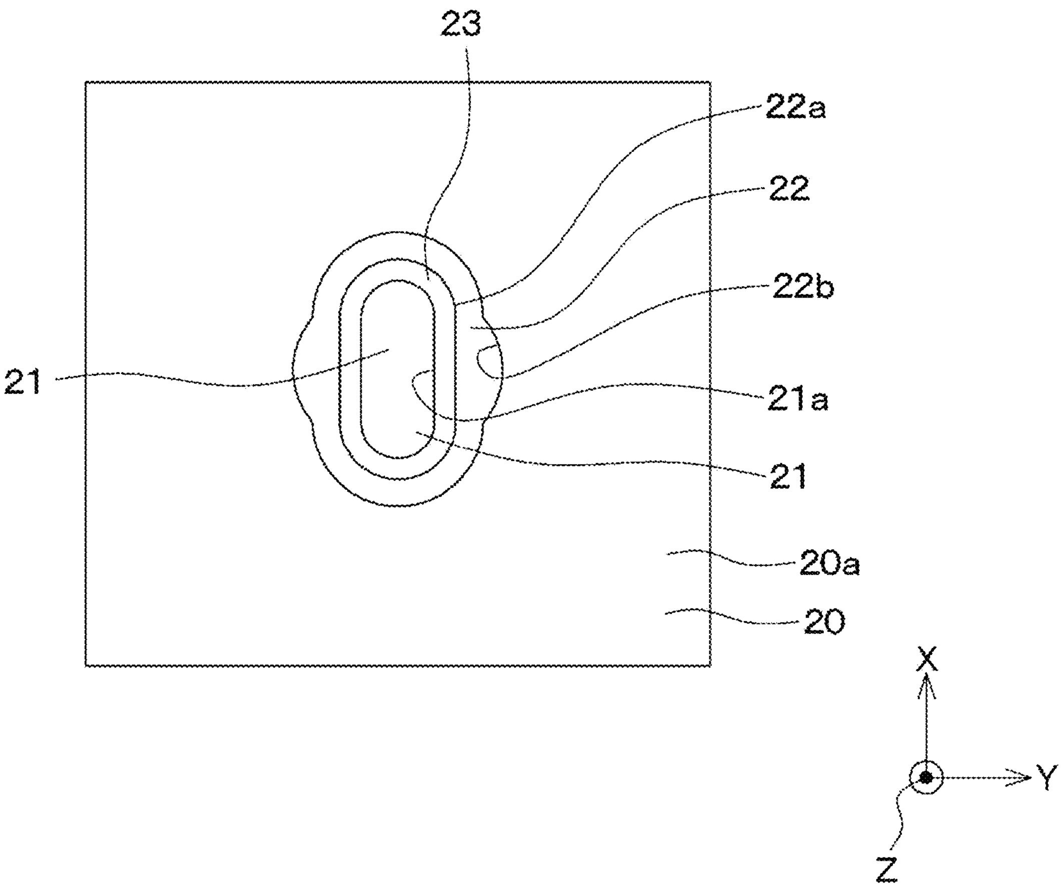
FIG. 15 is a plan view of a first surface of a second waveguide in another modification of the first embodiment.

As described in the first embodiment, since the width W of the choke groove 22 is unlikely to affect the transmission coefficient, the choke groove 22 may have a shape in which the outer wall surface 22*b* protrudes opposite from the second waveguide hole 21, as shown in FIG. 15.

Second Embodiment

The following describes a second embodiment of the present disclosure. In the present embodiment, the shape of the choke groove 22 is changed from that of the first embodiment. The other configurations of the present embodiment are similar to those of the first embodiment, and therefore a description of the similar configurations will not be repeated.

Figure 16:
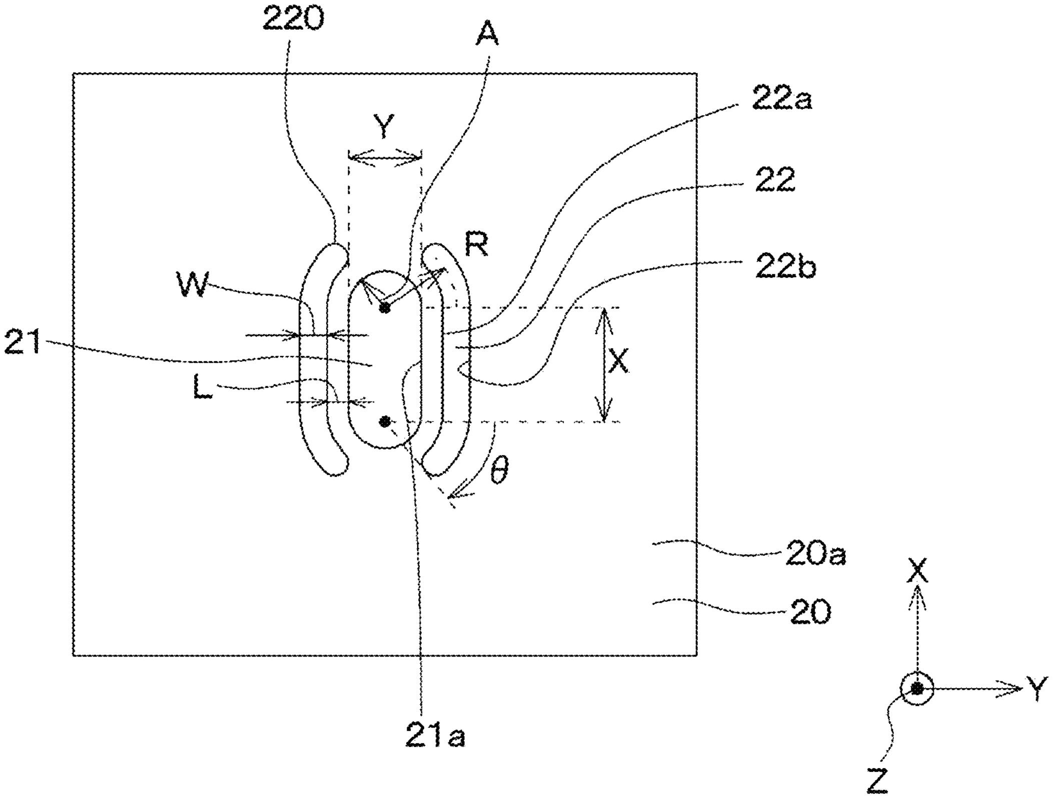
FIG. 16 is a plan view of a first surface of a second waveguide in a second embodiment.

As shown in FIG. 16, the choke groove 22 of the present embodiment has cutout portions 220 formed therein. Specifically, similarly to the first embodiment, the second waveguide hole 21 has an opening on the first surface 20*a*, and the opening has a rounded rectangular shape with its longer side extending in the X-axis direction. The choke groove 22 is formed at portions facing the second waveguide hole 21 in the Y-axis direction, but is not formed at portions facing the second waveguide hole 21 in the X-axis direction. In other words, the cutout portions 220 are formed so that the choke groove 22 does not have portions facing the second waveguide hole 21 in the X-axis direction.

The above is the configuration of the waveguide 1 in the present embodiment. The waveguide 1 can be used for forming a millimeter wave radar, for example, as in the first embodiment. In this case, when a transmission wave is transmitted to the waveguide 1 in the TE10 mode, the transmission wave is likely to leak from the gap g between the first waveguide 10 and the second waveguide 20 along the Y-axis direction (that is, the direction perpendicular to the long side of the second waveguide hole 21). Thus, the choke groove 22 in the present embodiment is formed at the portions that face the second waveguide hole 21 in the Y-axis direction, which are portions from which the transmission wave is likely to leak.

Figure 17:
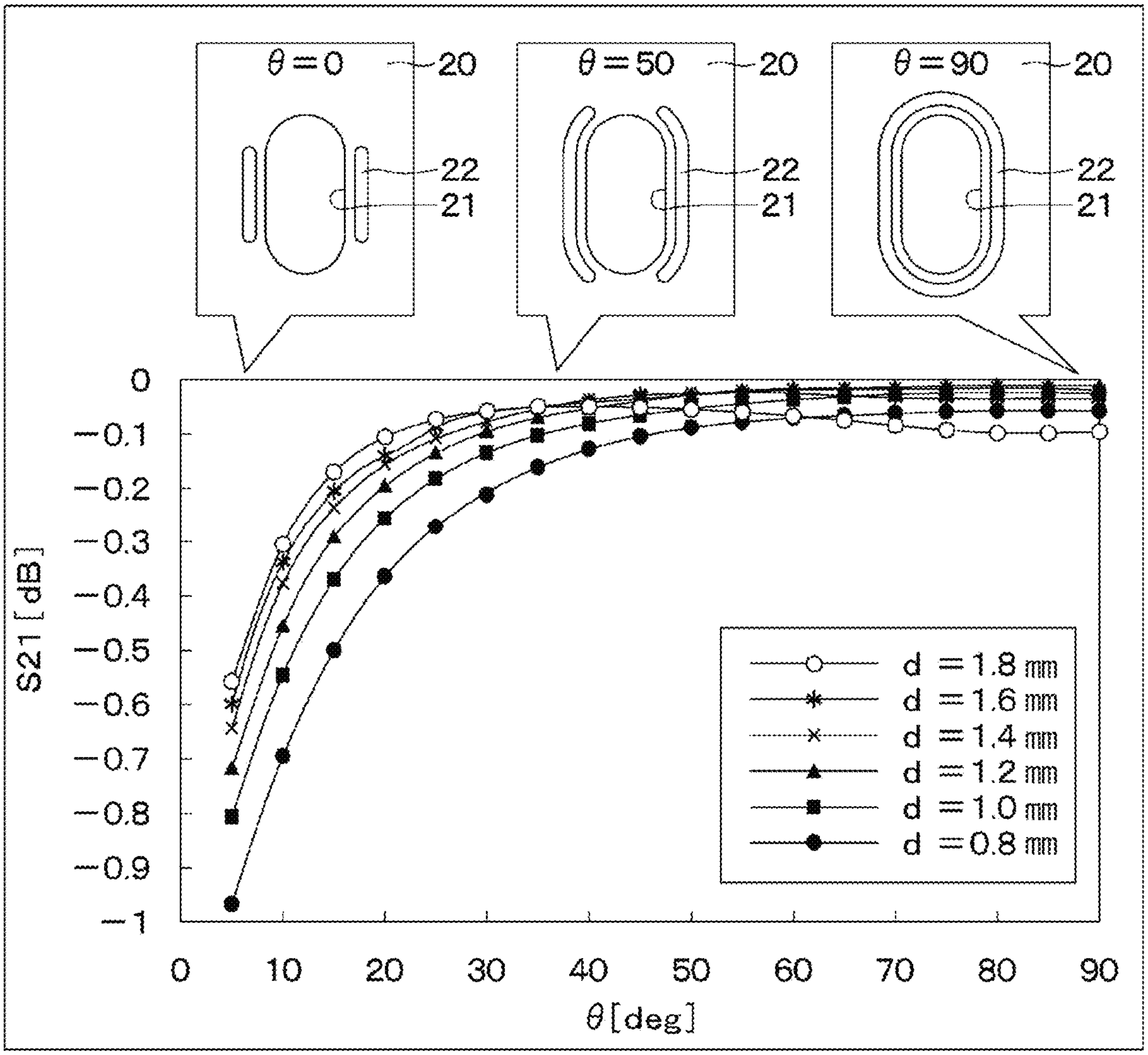
FIG. 17 is a diagram showing the relationship between an angle of an arc portion and transmission coefficient.

The present inventors conducted diligent studies on the size of the cutout portions 220 and the transmission coefficient S21, and obtained the results shown in FIG. 17. FIG. 17 shows the results when the typical operating frequency is 76.5 GHZ and the electrically effective wavelength λ is 3.92 mm. FIG. 17 shows the results when, as shown in FIG. 16, in the second waveguide hole 21, a length X of the long side along the X-axis direction is 1.4 mm, a length Y of the short side along the Y-axis direction is 1.15 mm, and a radius A of an arc connecting the two opposing sides extending along the X-axis direction is 0.575 mm. In addition, FIG. 17 shows the results when, as shown in FIG. 16, the width W is 0.475 mm=0.121λ, the length L is 0.3 mm=0.0765λ, and a length R between the center between the ends of two opposing sides of the second waveguide hole 21 along the X-axis direction and the center between the inner wall surface 22*a* and the outer wall surface 22*b* of a portion that forms an arc along the arc of the second waveguide hole 21 is 1.1125 mm=0.283λ. Furthermore, FIG. 17 shows the results when an angle θ is changed, where the angle of the portion of the choke groove 22 that forms the arc along the arc of the second waveguide hole 21 is set as the angle θ.

As shown in FIG. 17, the transmission coefficient S21 approaches 0 with increase in the angle θ. In other words, the transmission coefficient S21 approaches 0 with increase in the portion of the choke groove 22 surrounding the second waveguide hole 21. As described above with reference to FIG. 5, since the transmission coefficient S21 is −0.5 dB in the waveguide without the choke groove, it is preferable to select the angle θ at which the transmission coefficient S21 is −0.5 dB or greater depending on the depth d.

According to the present embodiment described above, the second waveguide 20 includes the resin molded product 200 and the thickness of the wall portion 23 is constant, so that the same effects as those in the first embodiment can be obtained.

As in the present embodiment, the choke groove 22 does not have to be shaped to completely surround the second waveguide hole 21. In such a case, it is preferable to form the choke groove 22 at portions where the transmission wave is likely to leak from the gap g. Furthermore, in the second waveguide 20, since the choke groove 22 is not formed so as to completely surround the second waveguide hole 21, it is easier to control the flow of resin when forming the resin molded product 200 that constitutes the second waveguide 20, and the manufacturing process can be simplified.

Modification of Second Embodiment

Figure 18:
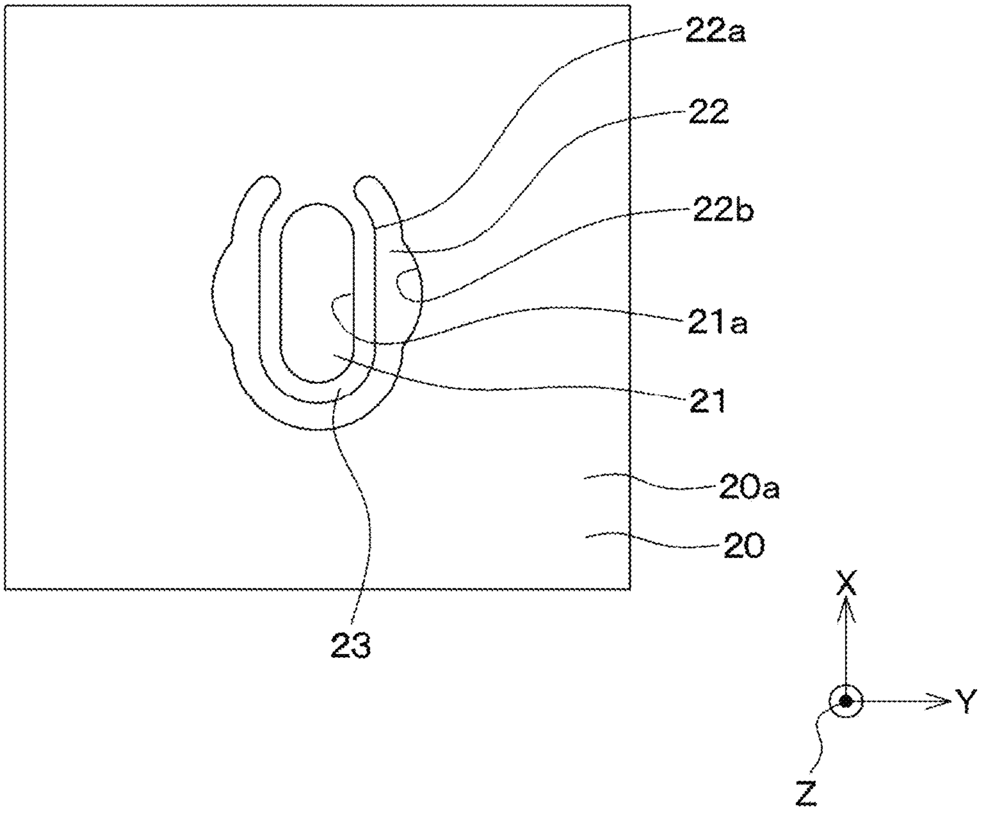
FIG. 18 is a plan view of a first surface of a second waveguide in a modification of the second embodiment.

A modification of the second embodiment will be described below. In the second embodiment described above, as shown in FIG. 18, the choke groove 22 may be formed at only one portion facing the second waveguide hole 21 in the X-axis direction, in addition to the portions facing the second waveguide hole 21 in the Y-axis direction.

Third Embodiment

The following describes a third embodiment of the present disclosure. In the present embodiment, a recessed portion is formed in the second waveguide 20 as compared with the first embodiment. The other configurations of the present embodiment are similar to those of the first embodiment, and therefore a description of the similar configurations will not be repeated.

Figure 19:
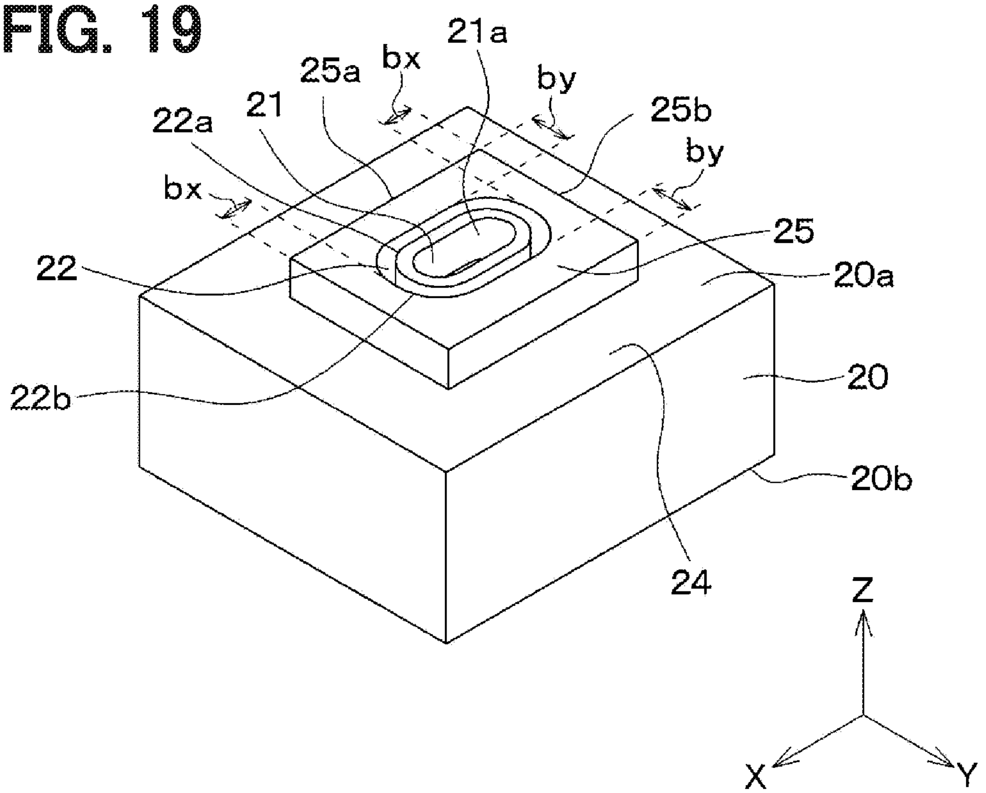
FIG. 19 is a perspective view of a second waveguide in a third embodiment.
Figure 20:
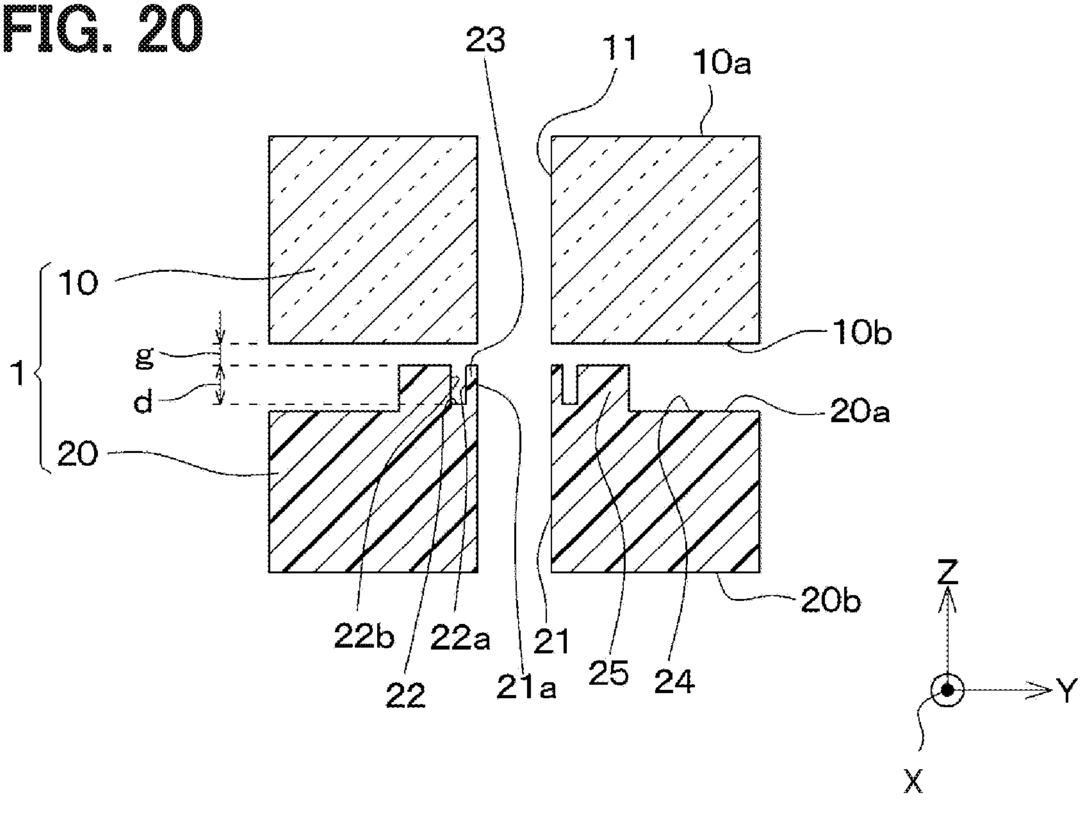
FIG. 20 is a cross-sectional view of a waveguide according to the third embodiment.

As shown in FIG. 19 and FIG. 20, in the waveguide 1 of the present embodiment, a recessed portion 24 is formed on the first surface 20*a* of the second waveguide 20 in a portion located across the choke groove 22 from the second waveguide hole 21. The second waveguide hole 21 and the choke groove 22 are formed so as to open in a protruding portion 25 that is provided inside the recessed portion 24 by forming the recessed portion 24. In the present embodiment, the recessed portion 24 has a rectangular frame shape, and a top surface of the protruding portion 25 has a rectangular shape. Specifically, the recessed portion 24 is formed so that the protruding portion 25 has end surfaces along the X-axis direction.

The first waveguide 10 and the second waveguide 20 are assembled in a state in which a predetermined gap g is maintained between the second surface 10*b* of the first waveguide 10 and the top surface of the protruding portion 25 of the second waveguide 20.

According to this configuration, by forming the recessed portion 24, the amount of resin required for the resin molded product 200 for forming the second waveguide 20 can be reduced.

Figure 21:
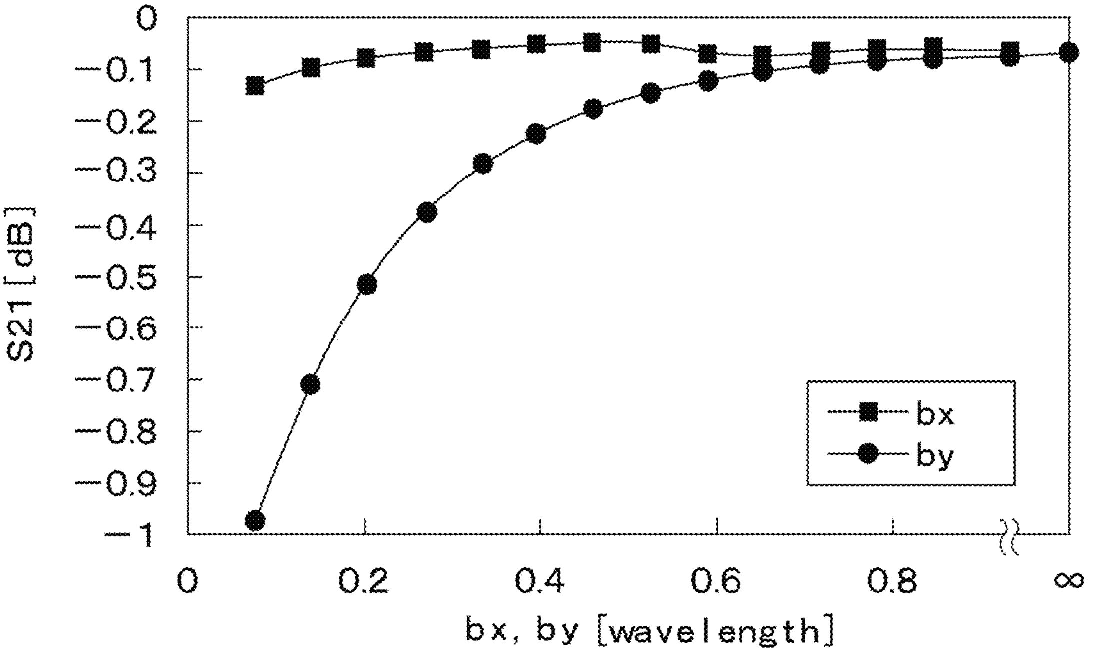
FIG. 21 is a diagram showing the relationship between lengths between an outer wall surface of a choke coil and first and second end surfaces of a protruding portion and transmission coefficient.

The present inventors conducted diligent studies on the transmission coefficient S21 of the waveguide 1 as follows. The end surfaces of the protruding portion 25 along the X-axis direction are defined as first end surfaces 25*a*, and the end surfaces along the Y-axis direction are defined as second end surfaces 25*b*. A length between the outer wall surface 22*b* of the choke groove 22 and the first end surface 25*a* is defined as a length "by", and a length between the outer wall surface 22*b* of the choke groove 22 and the second end surface 25*b* is defined as a length "bx". The present inventors conducted diligent studies on the lengths "bx" and "by" and the transmission coefficient S21, and obtained the results shown in FIG. 21. FIG. 21 shows the results when the typical operating frequency is 76.5 GHZ, the electrically effective wavelength λ is 3.92 mm, and the transmission wave is transmitted in the TE10 mode. As described above, when the transmission wave is in the TE10 mode, the transmission wave is likely to leak in the Y-axis direction.

As shown in FIG. 21, it has been confirmed that the transmission coefficient S21 does not change much even when the length "bx" is changed, but the transmission coefficient S21 improves with increase in the length "by". When the operating frequency is 76.5 GHZ, since the transmission coefficient S21 in the waveguide without the choke groove 22 is −0.5 dB as described above with reference to FIG. 5, it is preferable that the length "by" is 0.2λ or more, with which is the transmission coefficient S21 approaches 0 than-0.5 dB. Note that, multiple waveguides 1 each having the above-described structure are often arranged in a semiconductor module and the like, and an upper limit of the length "by" is determined by physical constraints.

According to the present embodiment described above, the second waveguide 20 is formed with the resin molded product 200 and the thickness of the wall portion 23 is constant, so that the same effects as those in the first embodiment can be obtained.

In the present embodiment, the recessed portion 24 is formed on the first surface 20*a* of the second waveguide 20 in the portion located across the choke groove 22 from the second waveguide hole 21. Therefore, the amount of resin required for the resin molded product 200 for forming the second waveguide 20 can be reduced. In the present embodiment, the length "by" is set to 0.2λ or more. Therefore, the deterioration of the transmission coefficient S21 can be restricted.

Modification of Third Embodiment

A modification of the third embodiment will be described. In the third embodiment, the configuration in which the amount of resin is reduced by forming the recessed portion 24 has been described. The amount of resin may be further reduced by removing other portions. For example, the second waveguide 20 may have a configuration in which excess portions are hollowed out (that is, removed) so that the amount of resin in a portion located around the second waveguide hole 21 along the axial direction of the second waveguide hole 21 is constant. With this configuration, when the resin molded product 200 is manufactured by pouring molten resin into a mold, the flow of resin can be more easily controlled.

Other Embodiments

Although the present disclosure has been described in accordance with the embodiments, it is understood that the present disclosure is not limited to such embodiments or structures. The present disclosure encompasses various modifications and variations within the scope of equivalents. In addition, various combinations and configurations, as well as other combinations and configurations that include only one element, more, or less, fall within the scope and spirit of the present disclosure.

For example, in the first to third embodiments, the first waveguide 10 may be formed with the choke groove 22 similar to that in the second waveguide 20.

In the first to third embodiments, the first waveguide 10 may be configured in a manner similar to the second waveguide 20, by disposing a metal coating film 201 on a resin molded product 200.

In addition, each of the above embodiments can be combined as appropriate. For example, the second embodiment may be combined with the third embodiment, and the second waveguide 20 may have the protruding portion 25 provided by forming the recessed portion 24.

What is claimed is:

1. A waveguide comprising:

a first waveguide having a first waveguide hole; and a second waveguide having a second waveguide hole and assembled to the first waveguide with a predetermined gap between the first waveguide and the second waveguide, wherein the first waveguide and the second waveguide are assembled in a state capable of transmitting an electromagnetic wave through the first waveguide hole and the second waveguide hole, the second waveguide hole has an opening on one surface of the second waveguide facing the first waveguide, and the opening has a rounded polygonal shape or a circular shape, the second waveguide includes a resin molded product and a metal coating film covering the resin molded product, and the second waveguide has a choke groove around the second waveguide hole, and the choke groove has such a shape that a length between a wall surface of the second waveguide hole and an inner wall surface of the choke groove adjacent to the second waveguide hole is constant along a circumferential direction of the second waveguide hole, the second waveguide has a recessed portion in a portion on the one surface located across the choke groove from the second waveguide hole, and a portion inside the recessed portion is a protruding portion.

2. The waveguide according to claim 1, wherein the choke groove has a frame shape surrounding the second waveguide hole.

3. The waveguide according to claim 1, wherein the opening of the second waveguide hole on the one surface of the second waveguide facing the first waveguide has the rounded polygonal shape, and a long side direction of the rounded polygonal shape is one direction in a planar direction of the one surface, and the choke groove faces the second waveguide hole in a direction intersecting with the long side direction in the planar direction of the one surface.

4. The waveguide according to claim 1, wherein a sum of the length between the wall surface of the second waveguide hole and the inner wall surface of the choke groove adjacent to the second waveguide hole and a depth of the choke groove is set to 0.2 to 0.7λ, where λ is a wavelength of the electromagnetic wave to be transmitted.

5. The waveguide according to claim 1, wherein the opening of the second waveguide hole on the one surface of the second waveguide facing the first waveguide has the rounded polygonal shape, and a long side direction of the rounded polygonal shape is one direction in a planar direction of the one surface, the protruding portion has an end surface along the long side direction, and a length between the end surface and an outer wall surface of the choke groove located opposite from the second waveguide hole is set to 0.2λ or more, where λ is a wavelength of the electromagnetic wave to be transmitted.

* * * * *